United States Patent Office 2,823,073
Patented Feb. 11, 1958

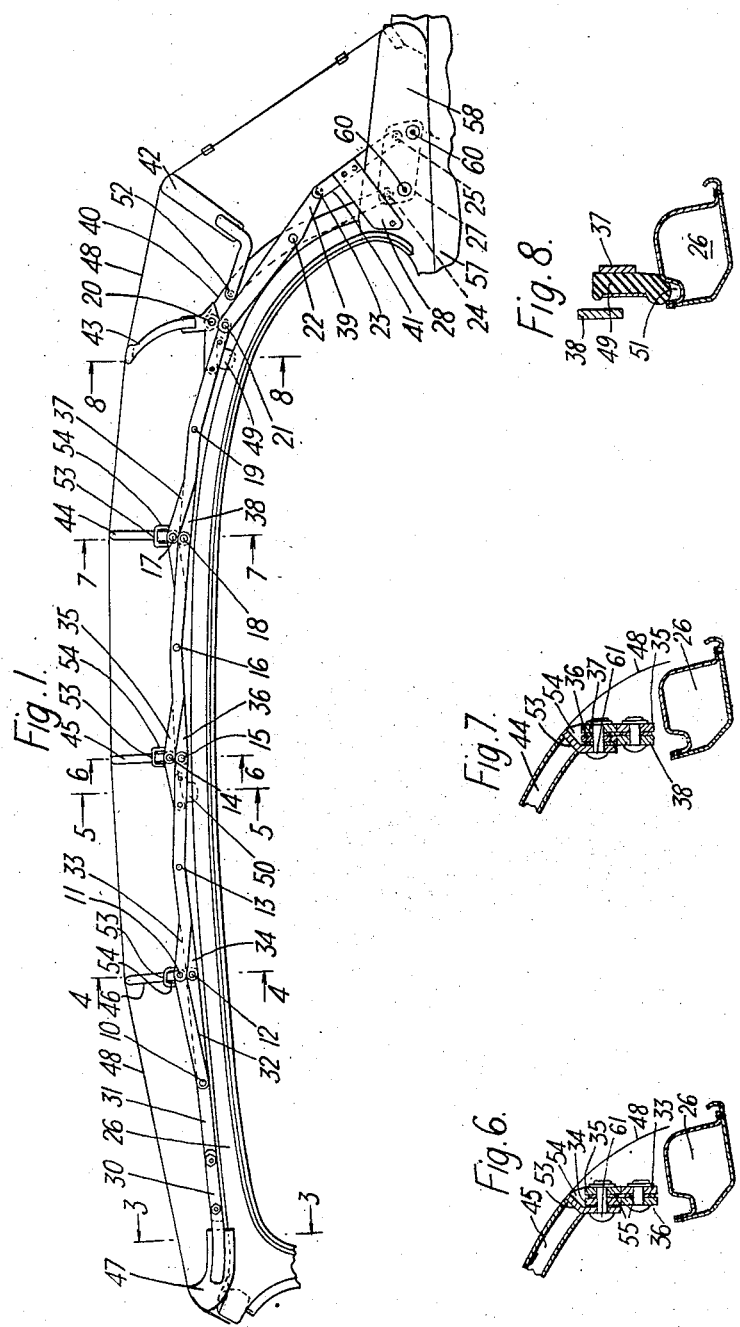

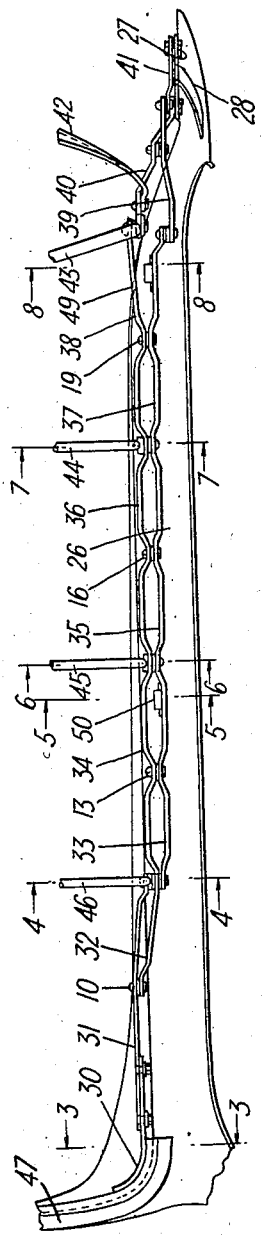
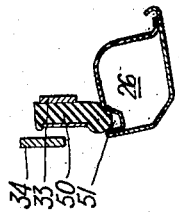
Fig. 5.
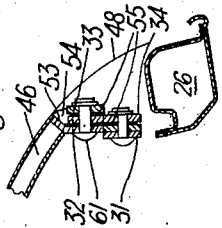
Fig. 4.
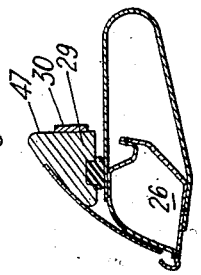
Fig. 3.

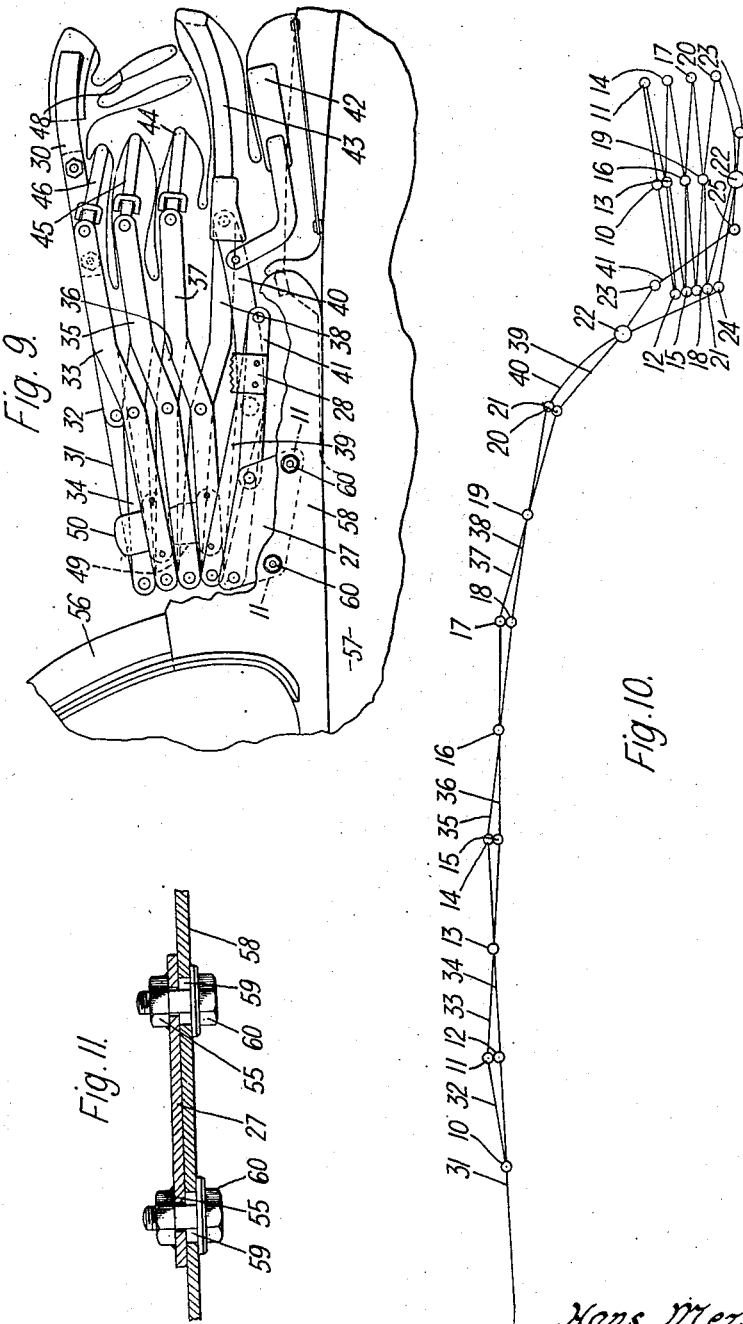

2,823,073
CONVERTIBLE AUTOMOBILE TOP

Hans Mersheimer and Philipp Orth, Russelsheim (Main), Germany, assignors to General Motors Corporation, Detroit, Mich., a corporation of Delaware Application December 20, 1954, Serial No. 476,440

Claims priority, application Germany January 7, 1954

6 Claims. (Cl. 296—116)

This invention relates to folding tops for convertible automobiles.

The manipulation of such folding tops is often awkward and difficult and must frequently be facilitated by additional means, such as springs and other source of power. Known foldable top constructions must be of heavy construction and are also of complicated design. They are therefore expensive, liable to give trouble and do not readily permit of production in quantity. Finally, in known constructions, the proportion between the length of the top and the length of its side supports is unsatisfactory. Thus, for example, the supports for the top often extend some distance along the top and limit the passengers field of view.

The main object of the invention is to eliminate these defects, particularly in those motor vehicles fitted with a fixed roof frame or stationary side walls.

According to the invention the foldable top in its extended or unfolded position supports itself on the roof frame, possibly through elastic members, and at the same time conforms to the contour of this frame.

Due to the fact that the top in the unfolded position supports itself on the roof frame or the side walls, its structure need only be of low strength. Thus it may be kept particularly light and can be drawn out up to its most extended position, i. e., until the toggle joints of its members touch each other.

The structural depth of the supporting system in comparision with the known roof assemblies may be considerably diminished and the weight reduced. Moreover rattling is also reduced.

A further advantage attainable through the invention, is that the rear points of attachment for the complete top may be placed behind a back seat, and no view-obstructing supports within the field of vision of the passengers are necessary. Moreover, the mounting of the hood is simplified; manufacturing tolerances can easily be circumvented and a hood which has become warped through the continued action of weather may be re-adjusted easily and conveniently.

The accompanying drawings show an example of a foldable top construction according to the invention.

In the drawings:

Fig. 1 shows a side elevation of the foldable top in the unfolded state with the covering material omitted;

Fig. 2, a plan of the top according to Fig. 1;

Figs. 3 to 8 are enlarged sections along lines 3—3, 4—4, 5—5, 6—6, 7—7, 8—8 in Figs. 1 and 2;

Fig. 9 a side elevation of the top in folded condition;

Fig. 10 a schematic representation of the top in both the folded and unfolded conditions; and Fig. 11 an enlarged section along line 11—11 of Fig. 9.

The foldable top construction consists of two scissor-like or lazy-tongs systems which rest on the roof frame 26 of a motor vehicle and are joined together by a plurality of bow members 42 to 47. They support and tension the top covering 48 when the top is in the unfolded or raised position. The top is symmetrically arranged with respect to the direction of travel, so that there are no fundamental differences between the left and right-hand halves.

The structure will therefore be described by way of example with reference to the left-hand half shown in the drawing.

The lazy-tongs system commences at the rear end of the roof frame 26, with a main member 40 and a guide member 39, which members are able to move about a pivot 22 (Figs. 1 and 10) situated approximately in the middle of same. The main member 40 is mounted on a bearing plate 27 by means of a hinge 24 whilst the hinge 23 of the guide member 39 is joined to the bearing plate 27 via a link 41, with the result that a four-sided linkage or articulated system is formed. A holder 28 for the top covering is secured to the link 41. It serves to guide the covering material 48 at the rear end of the vehicle in the manner intended.

The main and guide members 40, 39 are continued in the direction of travel, by four further pairs of members, 38, 37; 36, 35; 34, 33; 32, 31. These are pivotally-united crosswise by hinges 19, 16, 13, 10 and the pairs are connected to each other through toggle joints 21, 20, 18, 17, 15, 14, 12 and 11 (see Figs. 1, 2 and 10). The forward bow 47 is secured to the member 31 of the lazy-tongs system through the member 30 and when the top is in the unfolded condition it rests on the windscreen frame which constitutes a part of the roof frame and to which the top may be attached by fastenings.

In the unfolded position, the lazy-tongs system supports itself on the roof frame 26. For this purpose, each side of the top is provided with elastic elements, e. g., two rubber cushions 49, 50 at each side. These rest in recesses 51 of the roof frame 26 and thereby secure the top in lateral direction also (see Fig. 1 and Figs. 5 and 8).

The front bow 47 also rests on the wind-screen frame 26 with the interposition of a rubber bolster 29. Due to the fact that the top rests on the roof frame, the lazy-tongs may be moved into their most extended position until their toggle joints 21, 20, 18, 17, 15, 14, 12 and 11 touch each other (see Figs. 4, 6, 7).

The members 40 to 31 thereby lock themselves so that after the attachment of the forward bow 47 to the front of the roof frame 26 the entire top is firmly pressed against said frame. As a result, the structural depth of the lazy-tongs system is kept to the lowest possible. Moreover as the parts are under tension, rattling noises are eliminated.

In order to adapt the course of the lazy-tongs to the roof frame, the spacing of the upper toggle joints 20, 17, 14, 11 is greater than that of the toggle joints 21, 18, 15, 12 situated below at the frame so that adjacent pairs of joints (e. g. 14, 17, 18, 15) form a trapezium.

The bows 44, 45, 46 as well as the main bow 43 are mounted in the respective upper toggle joints 20, 17, 14, 11 of the lazy-tongs; only the rear bow 42 is secured to the main member 40 via a hinged joint 52 and by reason of its shape is able to support itself on same.

The bows 43 to 46 are made of tubing and span the passenger space. Welded on to their ends are hinge plates 53 which are bent at an angle. These are pivotally mounted by means of rivets 61 in the respective upper toggle joints 17, 14, 11 of the lazy-tongs. Their attachment is effected simultaneously by the rivets for connecting the individual members together.

The hinge plates 53 of the bows are further bent over at right angles in their upper region so as to form lugs 54 which, when the hood is closed, rest on the upper edges of the members and maintain the bows in the erect position (see Figs. 1, 4, 6, 7).

When seen in plan the diagonal members such as 33, 34 or 35, 36, run at a distance of from 1 to 2 cm. apart (see Fig. 2) and are bent towards each other in the region of the hinge joints 22 to 10 only, with the result that there is no risk of a finger being pinched when the top is folded or unfolded. At the joints 22 to 10, washers 55 are arranged so as to permit easy manipulation.

The top construction requires accurate mounting on the vehicle. Even small tolerances otherwise permissible in the manufacture of the body could prevent the hood in its closed position from resting on the roof frame in the manner desired. For this reason the main member 40 and the link 41 are mounted on a bearing plate 27. This plate 27 is of parallelogram form and possesses two welded-on nuts 55.

The rear portion 56 of the roof frame 26 runs obliquely backwards and downwards and abuts against the side wall of the coachwork (see Figs. 9 and 11). In this region, i. e. behind the back seats, a mounting plate 58 welded to the vehicle body is provided. It has two holes 59 whose diameters are greater than necessary for the bolts 60 employed.

Consequently it is possible to adjust the entire top during assembly. This assembly may be carried out by placing the extended lazy-tongs on the roof frame and securing the forward bow 47 to the windscreen frame. Finally the bolts 60 are tightened up. Since the holes 59 are of enlarged diameter, sufficient play is available to cancel out inaccuracies of manufacture. Moreover if the top eventually becomes distorted under the continual influence of weather, this can be corrected by readjustment. Of course the holes 59 may be shaped as slots.

In order to bring the top from the unfolded position shown in Fig. 1 to the folded position according to Fig. 9, the forward bow 47 is lifted up slightly. The main bow 42 can then be forced or pulled backwards whereupon the top collapses into itself. The top can be opened when the vehicle is in motion. Here again the forward bow 47 must be slightly raised and the top is then carried along into the opened position (Fig. 9) by the air stream.

As will be seen from Figs. 9 and 10, in this condition the toggle joints 12, 15, 18, 21 and the joint 24 lie directly one upon the other whilst the toggle joints 11, 14, 17 and 20 lie at a distance from each other. At the same time the cover material 48 is not pinched by the members and the bows. The advantage is obtained as follows: As already stated above, the toggle joints (14, 17, 18, 15, for example) form a trapezium when the top is closed. The hinge 16 situated between them does not coincide with the point of intersection of the diagonals of the trapezium but is intentionally shifted upwards by a small amount. The further the hinges lie above the point of intersection of the trapezium diagonals, the greater is the spacing of the toggle joints 11, 14, 17, 20 when the hood is in the folded condition (see Fig. 10).

The points of attachment (24 and 25) of the top to the body lie behind the back seats and behind the roof frame running obliquely downwards. As a consequence there are no obstructing top supports, rods, or the like in the field of vision of the passengers.

We claim:

1. In a vehicle body, a folding top frame comprising, a pair of spaced foldable side rails, each of said side rails including a plurality of lazy tong linkage arrangements movable between folded and unfolded positions to raise and lower said top frame with respect to said body, each said arrangement including a pair of members pivotally interconnected intermediate the ends thereof, the free ends of each of said members being pivotally connected to the free ends of respective members of adjacent linkage arrangements whereby said pivotal connections between each said arrangement and the adjacent arrangements thereto define upper and lower pairs of toggle joints in the unfolded position of said arrangements, with the spacing between said upper pair of toggle joints being greater than the spacing between said lower pair of toggle joints, and transverse bow means interconnecting said spaced foldable side rails.

2. In a vehicle body, a folding top frame comprising, a pair of spaced foldable side rails, each of said side rails including a plurality of lazy tong linkage arrangements movable between folded and unfolded positions to raise and lower said top frame with respect to said body, each said arrangement including a pair of members, first pivot means pivotally interconnecting said members intermediate the ends thereof, second pivot means interconnecting the free ends of each of said members with the free ends of respective members of adjacent linkage arrangements whereby said second pivot means between each said arrangement and the adjacent arrangements thereto define upper and lower pairs of toggle joints in the unfolded position of said arrangements, the spacing between said upper pair of toggle joints being greater than the spacing between the lower pair of toggle joints, with said first pivot means lying to the upper side of the intersection of lines through diagonally opposite second pivot means, and transverse bow means interconnecting said spaced foldable side rails.

3. In a vehicle body, a folding top frame comprising, a pair of spaced foldable side rails, each of said side rails including a plurality of lazy tong linkage arrangements movable between folded and unfolded positions to raise and lower said top frame with respect to said body, each said arrangement including a pair of members pivotally interconnected intermediate the ends thereof, the free ends of each of said members being pivotally connected to the free ends of respective members of adjacent linkage arrangements whereby said pivotal connections between each said arrangement and the adjacent arrangements thereto define upper and lower pairs of toggle joints in the unfolded position of said arrangements, the spacing between said upper pairs of toggle joints being greater than the spacing between said lower pairs of toggle joints whereby in said folded position of said arrangements said lower pairs of toggle joints are in engagement with each other and said upper pairs of toggle joints are in spaced relationship to each other, and transverse bow means interconnecting said spaced foldable side rails.

4. In a vehicle body, a folding top frame comprising, a pair of spaced foldable side rails, each of said side rails including a plurality of lazy tong linkage arrangements movable between folded and unfolded positions to raise and lower said top frame with respect to said side rails, each said arrangement including a pair of members pivotally interconnected intermediate the ends thereof, the free ends of each of said members being pivotally connected to the free ends of respective members of adjacent linkage arrangements whereby said pivotal connections between each said arrangement and the adjacent arrangement thereto, define upper and lower pairs of toggle joints in the unfolded position of said arrangements, the spacing between said upper pairs of toggle joints being greater than the spacing between said lower pairs of toggle joints whereby said lower pairs of toggle joints are in engagement with said upper pairs of toggle joints in said unfolded position of said arrangements and are in engagement with each other in said folded position of said arrangements, and transverse bow means interconnecting said spaced foldable side rails.

5. In a vehicle body, a folding top frame comprising, a pair of spaced foldable side rails, each of said side rails including a plurality of lazy tong linkage arrangements movable between folded and unfolded positions to raise and lower said top frame with respect to said body, each said arrangement including a pair of members pivotally interconnected intermediate the ends thereof, the free ends of each of said members being pivotally connected to the free ends of respective members of adjacent linkage arrangements whereby said pivotal connections between each said arrangement and the adjacent arrangements thereto define spaced pairs of upper and lower toggle joints in the unfolded position of said arrangements, the spacing between said upper toggle joints being greater than the spacing between said lower toggle joints, with each upper toggle joint of said pairs being in engagement with each lower toggle joint in the unfolded position of said arrangements, and transverse bow means interconnecting said spaced foldable side rails.

6. In a vehicle body, a folding top frame comprising, a pair of spaced foldable side rails, each of said side rails including a plurality of lazy tong linkage arrangements movable between folded and unfolded positions to raise and lower said top frame, each said arrangement including a pair of members pivotally interconnected intermediate the ends thereof, with the free ends of each of said members being pivotally connected to the free ends of respective members of adjacent linkage arrangements whereby said pivotal connections between each said arrangement and the adjacent arrangements thereto define spaced pairs of upper and lower toggle joints in the unfolded position of said arrangements, each of said upper toggle joints being in engagement with a respective lower toggle joint in the unfolded position of said linkage arrangements and being located in spaced relationship with respect to each other in the folded position of said linkage arrangements, and transverse bow means interconnecting said spaced foldable side rails.

References Cited in the file of this patent

UNITED STATES PATENTS

| | | |
|---|---|---|
| 1,301,619 | Szemanski | Apr. 22, 1919 |
| 1,301,894 | Audia | Apr. 29, 1919 |
| 2,184,537 | Valletta | Dec. 26, 1939 |
| 2,620,223 | Doty | Dec. 2, 1953 |
| 2,694,598 | Ulrich | Nov. 16, 1954 |

FOREIGN PATENTS

| | | |
|---|---|---|
| 312,485 | Great Britain | May 30, 1929 |
| 637,871 | Great Britain | May 31, 1950 |